US010764280B2

(12) United States Patent
Kim et al.

(10) Patent No.: US 10,764,280 B2
(45) Date of Patent: Sep. 1, 2020

(54) METHOD AND APPARATUS FOR AUTHENTICATION BASED ON FINGERPRINT RECOGNITION

(71) Applicant: Samsung Electronics Co., Ltd., Suwon-si, Gyeonggi-do (KR)

(72) Inventors: Wonjun Kim, Hwaseong-si (KR); Chilhee Chung, Seoul (KR); Jung-Bae Kim, Seoul (KR); Chang Kyu Choi, Seongnam-si (KR); Seungju Han, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 497 days.

(21) Appl. No.: 15/001,548

(22) Filed: Jan. 20, 2016

(65) Prior Publication Data
US 2017/0063851 A1 Mar. 2, 2017

(30) Foreign Application Priority Data
Aug. 31, 2015 (KR) ........................ 10-2015-0122778

(51) Int. Cl.
H04L 29/06 (2006.01)
G06K 9/00 (2006.01)
G06F 3/044 (2006.01)
H04W 12/06 (2009.01)
(Continued)

(52) U.S. Cl.
CPC .......... H04L 63/0861 (2013.01); G06F 3/044 (2013.01); G06K 9/00087 (2013.01); H04M 1/673 (2013.01); H04W 12/06 (2013.01); G06F 2203/04104 (2013.01); H04M 1/66 (2013.01); H04M 2250/22 (2013.01)

(58) Field of Classification Search
CPC ................. H04L 63/0861; G06F 3/044; G06F 2203/04104; H04M 1/673; H04M 1/66; H04M 1/66; G06K 9/2081; G06K 9/0001; G06K 9/00375; G06K 9/00335; G06K 9/00006; G06K 9/00389
USPC .......................................................... 726/7
See application file for complete search history.

(56) References Cited

U.S. PATENT DOCUMENTS

2008/0140967 A1* 6/2008 Breslau .................. G06F 21/80
711/163
2008/0166028 A1* 7/2008 Turek .................. G06K 9/0002
382/124
2009/0083850 A1 3/2009 Fadell et al.
(Continued)

FOREIGN PATENT DOCUMENTS

JP H10154231 A 6/1998
JP 2012059084 A 3/2012
(Continued)

Primary Examiner — Ashokkumar B Patel
Assistant Examiner — William B Jones
(74) Attorney, Agent, or Firm — Harness, Dickey & Pierce, P.L.C.

(57) ABSTRACT

A fingerprint recognition based authentication method and apparatus is disclosed. The authentication apparatus may obtain an input fingerprint from a touch input of a user, determine an input number corresponding to the input fingerprint using preregistered fingerprint-number mapping information, and authenticate the user based on whether an input number sequence corresponding to an input fingerprint sequence is identical to a reference number sequence.

14 Claims, 18 Drawing Sheets

(51) Int. Cl.
*H04M 1/673* (2006.01)
*H04M 1/66* (2006.01)

(56) References Cited

U.S. PATENT DOCUMENTS

| | | | | |
|---|---|---|---|---|
| 2009/0270810 | A1* | 10/2009 | DeBelser | G16H 20/17 604/151 |
| 2010/0240415 | A1 | 9/2010 | Kim et al. | |
| 2012/0174214 | A1* | 7/2012 | Huang | G06F 21/32 726/19 |
| 2014/0340343 | A1* | 11/2014 | Han | G06F 3/0484 345/173 |
| 2015/0015365 | A1* | 1/2015 | Ortiz | H04L 63/0861 340/5.53 |
| 2015/0084743 | A1* | 3/2015 | G | G06F 3/0487 340/5.83 |
| 2015/0296062 | A1* | 10/2015 | Lee | G06F 3/04886 455/566 |
| 2016/0239701 | A1* | 8/2016 | Lee | G06K 9/00067 |

FOREIGN PATENT DOCUMENTS

| | | |
|---|---|---|
| KR | 20040025004 A | 3/2004 |
| KR | 20050058792 A | 6/2005 |
| KR | 20050095186 A | 9/2005 |
| KR | 20110103598 A | 9/2011 |
| KR | 101549558 B1 | 9/2015 |

\* cited by examiner

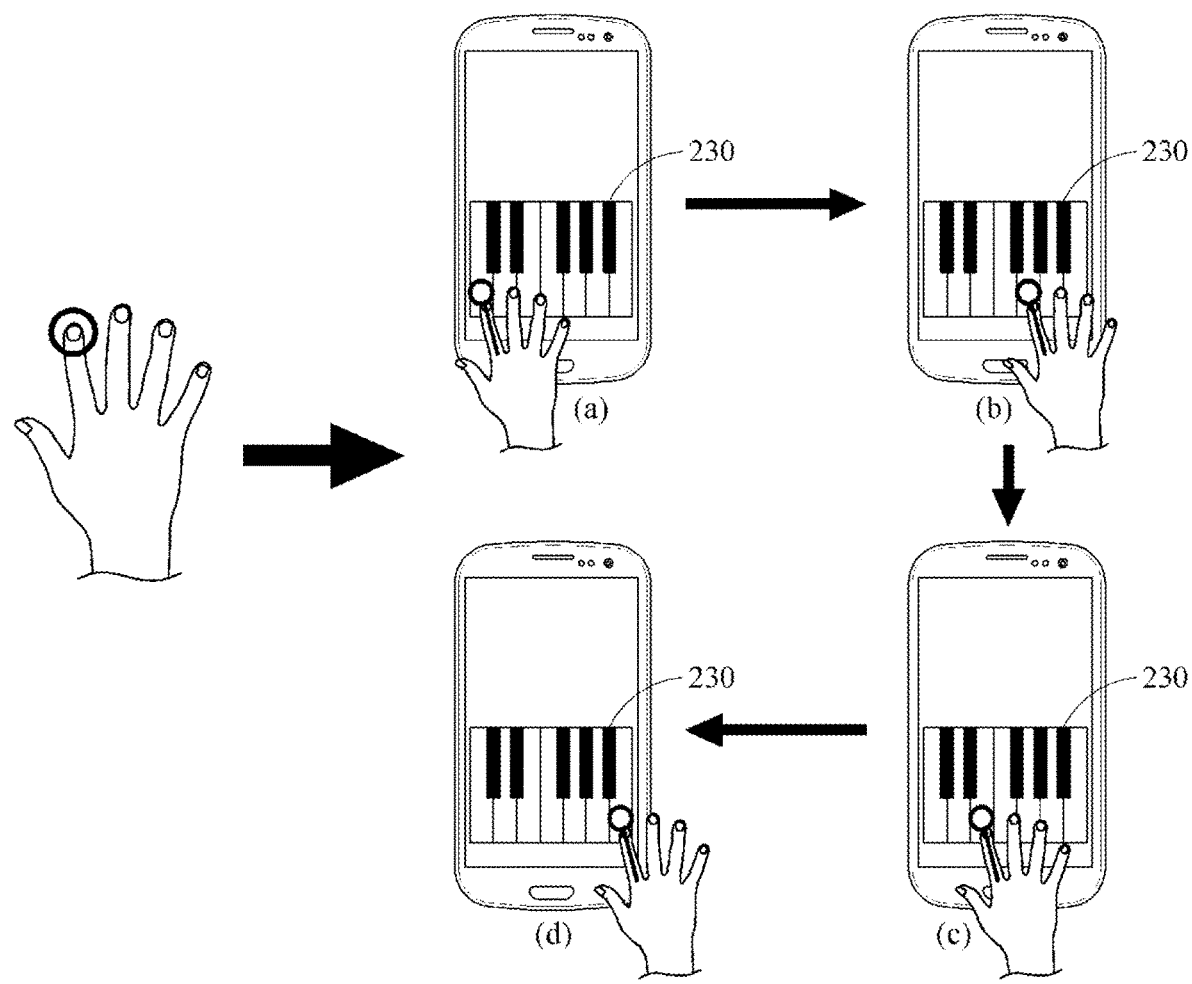

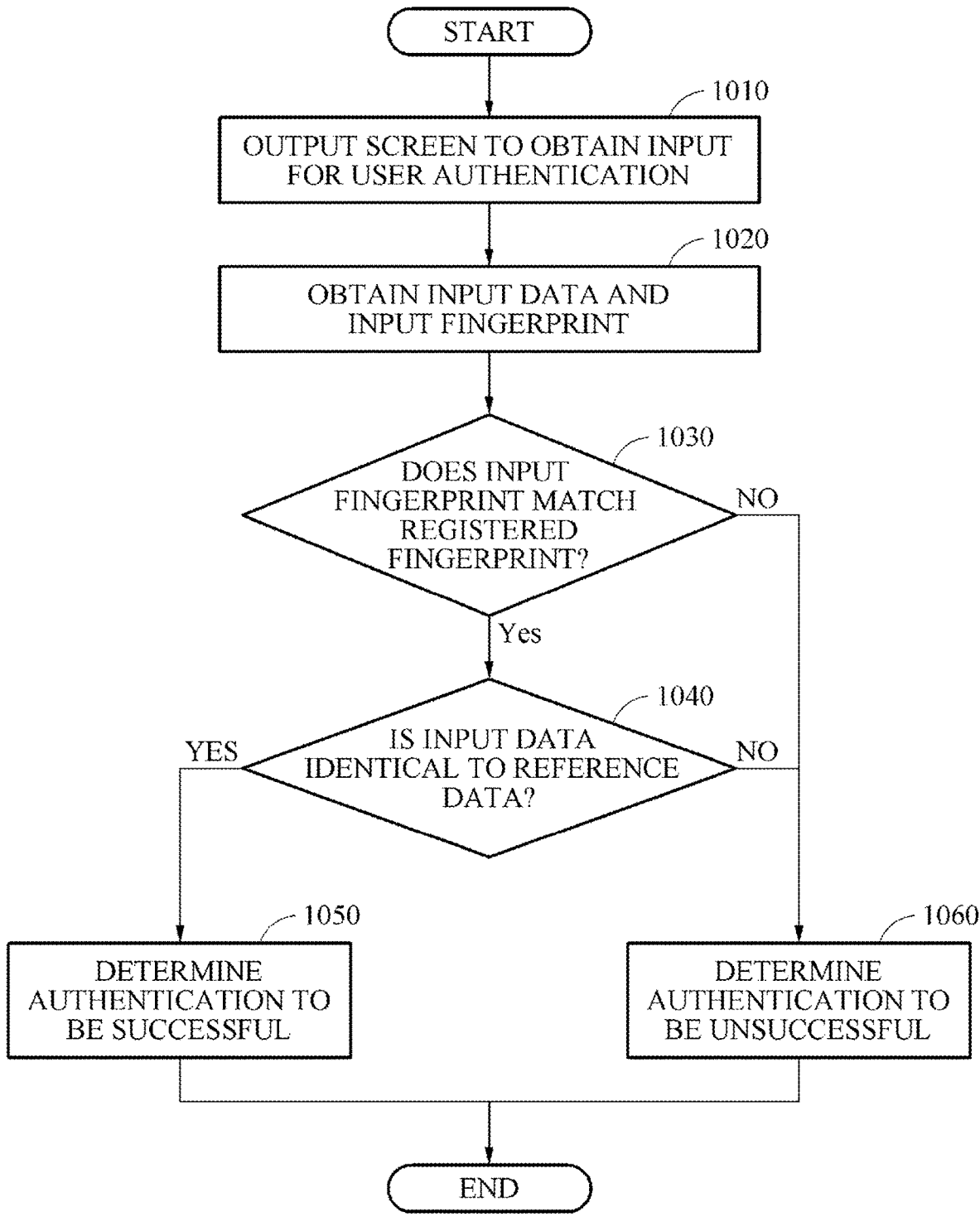

METHOD AND APPARATUS FOR AUTHENTICATION BASED ON FINGERPRINT RECOGNITION

CROSS-REFERENCE TO RELATED APPLICATION

This application claims under 35 U.S.C. § 119 to Korean Patent Application No. 10-2015-0122778, filed on Aug. 31, 2015, in the Korean Intellectual Property Office, the entire contents of which are incorporated herein by reference in its entirety.

BACKGROUND

1. Field

At least one example embodiment relates to user authentication technology based on fingerprint recognition.

2. Description of the Related Art

Amid development of smartphones and various mobile and wearable devices, an importance of secure authentication technology has been increasing. In related arts, a method of inputting a password identical to a preregistered password and authenticating a user based on the input password is generally used. Recently, fingerprint recognition is widely used for various applications, for example, lock and unlock of a user device, mobile payment, and control of entrance into and exit from a building, due to a high level of convenience, security, and economical efficiency of such technology. In fingerprint recognition, a general method may include obtaining a fingerprint image of a user through a sensor, comparing a fingerprint in the fingerprint image to a preregistered fingerprint, and authenticating the user. However, fingerprint recognition may be vulnerable to an issue of fake fingerprints, despite a high recognition rate. Thus, research has been actively conducted to achieve a higher level of security in relation to fingerprint recognition.

SUMMARY

At least one example embodiment relates to a fingerprint recognition based authentication method.

In at least one example embodiment, the method may include obtaining an input fingerprint from a touch input of a user, determining an input number corresponding to the input fingerprint using preregistered fingerprint-number mapping information, and performing user authentication based on whether an input number sequence corresponding to an input fingerprint sequence is identical to a reference number sequence.

The determining of the input number may include determining whether a registered fingerprint matching the input fingerprint is present among registered fingerprints stored in a storage device and determining, to be the input number corresponding to the input fingerprint, a number corresponding to the registered fingerprint matching the input fingerprint, in response to determining the registered fingerprint matching the input fingerprint is present among the registered fingerprints.

The performing of the user authentication may include determining the user authentication to be successful in response to the input number sequence being identical to the reference number sequence, and determining the user authentication to be unsuccessful if the determining an input number corresponding to the input fingerprint fails to determine the input number.

The obtaining of the input fingerprint may include obtaining the input fingerprint from the touch input made within a preset area on a display.

At least one example embodiment relates to a fingerprint recognition based authentication method.

In at least one example embodiment, the method may include outputting a screen to obtain an input for user authentication, obtaining input data from a touch input sequence of touch inputs to the screen and obtaining an input fingerprint from a touch input, and performing the user authentication based on whether the input data is identical to preregistered reference data and whether the input fingerprint matches a registered fingerprint of a user.

The performing of the user authentication may include determining a number corresponding to the input fingerprint using preregistered fingerprint-number mapping information, and performing the user authentication based on whether a number input through the touch input is identical to the number corresponding to the input fingerprint.

The performing of the user authentication may include determining whether an input fingerprint detected from a touch input matches the registered fingerprint each time a touch input is made.

The obtaining of the input fingerprint may include obtaining the input fingerprint from the touch input at a preset point in a time section in which the touch input is made.

At least one example embodiment relates to a fingerprint recognition based authentication apparatus.

In at least one example embodiment, the apparatus may include a fingerprint sensor configured to obtain an input fingerprint from a touch input from a user, and a user authenticator configured to determine an input number corresponding to the input fingerprint using preregistered fingerprint-number mapping information and authenticate the user based on whether an input number sequence corresponding to an input fingerprint sequence is identical to a reference number sequence.

At least one example embodiment relates to a fingerprint recognition based authentication apparatus.

In at least one example embodiment, the apparatus may include a display configured to output a screen to receive an input for user authentication, a fingerprint sensor configured to obtain an input fingerprint from a touch input to the screen, and a user authenticator configured to perform user authentication based on whether input data obtained from a touch input sequence of touch inputs to the screen is identical to preregistered reference data and whether the input fingerprint matches a registered fingerprint of a user.

Additional aspects of example embodiments will be set forth in part in the description which follows and, in part, will be apparent from the description, or may be learned by practice of the disclosure.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 10 is a flowchart illustrating another example of a fingerprint recognition based authentication method according to at least one example embodiment.

DETAILED DESCRIPTION

Figure 1:
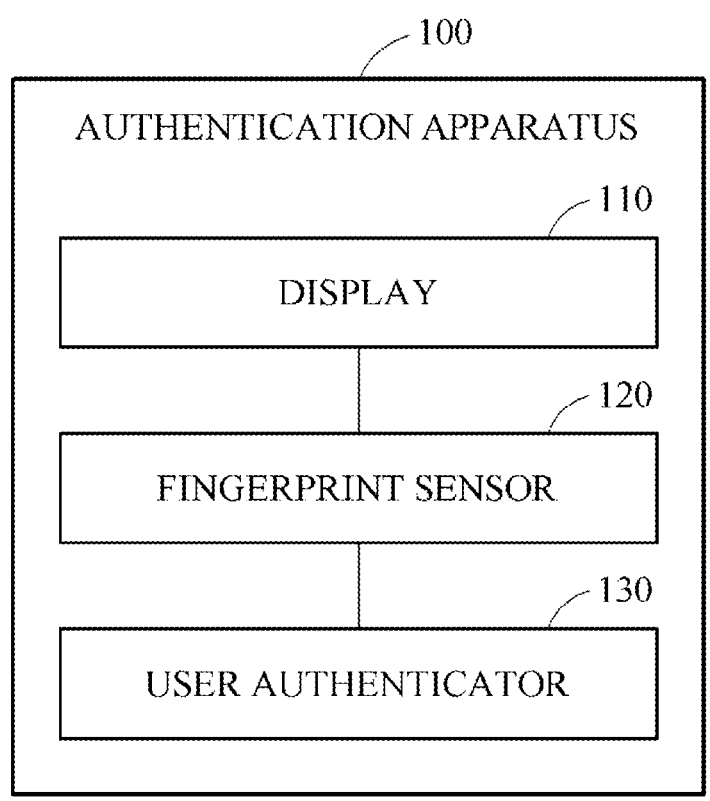
FIG. 1 is a diagram illustrating a configuration of a fingerprint recognition based authentication apparatus according to at least one example embodiment.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

In the following description, a method of verifying or authenticating a user based on fingerprint recognition, hereinafter simply referred to as a fingerprint recognition based authentication method, may include an operation of determining whether the user is a same person as a preregistered user based on a recognized fingerprint, or an operation of determining which one the user corresponds to among preregistered users.

Example embodiments to be described hereinafter may be provided as or implemented by products of various forms, for example, a mobile device such as a smartphone, an automated teller machine (ATM), a digital camera, a portable game terminal, a personal digital assistant (PDA), a portable multimedia player (PMP), a navigation device, a personal computer (PC), a laptop computer, a tablet computer, a smart appliance, an intelligent vehicle, a kiosk, and an wearable device. However, the example embodiments may not be limited thereto, and may be applicable to all electronic devices for which a user authentication function is used. In addition, in a case of a fingerprint recognition based payment service, the example embodiments may be applied to authenticate a user through fingerprint recognition.

FIG. 1 is a diagram illustrating a configuration of a fingerprint recognition based authentication apparatus according to at least one example embodiment. Hereinafter, the fingerprint recognition based authentication apparatus will be simply referred to as an authentication apparatus 100. The authentication apparatus 100 may recognize a fingerprint of a user during a verification process, also referred to as an authentication process, for which the user inputs a personal identification number (PIN) such as a password number or inputs a pattern. The authentication apparatus 100 may authenticate the user by determining whether the input PIN or pattern is identical to a preregistered PIN or pattern and also by determining whether a fingerprint recognized while the PIN or pattern is input matches a registered fingerprint of the user.

Referring to FIG. 1, the authentication apparatus 100 includes a display 110, a fingerprint sensor 120, and a user authenticator 130. An operation of the user authenticator 130 may be performed by at least one processor.

The display 110 may output a screen to receive an input for user authentication. For example, the display 110 may output a keypad to receive a password number from a user or output a screen to receive a pattern from the user. For another example, the display 110 may output a screen on which an area is displayed to receive a fingerprint of the user.

According to an example embodiment, the fingerprint sensor 120 may obtain an input fingerprint from a touch input made on the screen. When the user touches the display 110 to make an input for the user authentication, the fingerprint sensor 120 may obtain a touch input image by capturing the touch input to the display 110, and obtain an input fingerprint of the user from the obtained touch input image. The fingerprint sensor 120 may detect the input fingerprint of the user from the touch input to the display 110 based on an optical method, a capacitance-based method, or an ultrasound-based method. However, a method of detecting a fingerprint from a touch input to the display 110 to be performed by the fingerprint sensor 120 may not be limited to one of the foregoing methods. For example, invisible light may be emitted from an interior of the display 110 towards a surface of the display 110 to detect a fingerprint of the user, light reflected by a finger touching the display 110 may be detected by the fingerprint sensor 120, and thus a touch input image may be obtained. The touch input image may include an image of the fingerprint of the finger touching the display 110. The fingerprint sensor 120 may be disposed in a lower portion of the display 110 or in a stack structure of the display 110. However, a location of the fingerprint sensor 120 may not be limited to the foregoing locations.

According to another example embodiment, the fingerprint sensor 120 may be embedded in a button, for example, a home button of a mobile device, and detect a fingerprint of a finger of the user touching the button based on the capacitance-based method or the ultrasound-based method. However, a method of detecting a fingerprint to be performed by the fingerprint sensor 120 may not be limited to the foregoing methods.

The user may input a password number through touch inputs made on the screen for the user authentication or input a pattern to the screen while maintaining a touch input. The user authenticator 130 may determine input data such as the password number or the pattern from a touch input sequence of the touch inputs to the screen of the display 110. The user authenticator 130 may detect an input fingerprint at each time a touch input is made, and determine an input number corresponding to the input fingerprint using prestored user registration information. The user authenticator 130 may determine the password number input from the user based on an input number sequence corresponding to the touch input sequence.

The user registration number may be generated through a user registration process prior to an authentication process, and include fingerprint information of each finger of a user, fingerprint information of each user, fingerprint information based on a fingerprint recognition pattern, and fingerprint-number mapping information. For example, the fingerprint information may include fingerprint information of a thumb, an index finger, a middle finger, a ring finger, and a little finger of the user, and be stored for each user as, for example, fingerprint information of a first user and fingerprint information of a second user. For a fingerprint of a same finger, various fingerprint recognition patterns may be generated depending on a fingerprint recognition area or an intensity at which a fingerprint makes contact, and fingerprint information based on the various fingerprint recognition patterns may be stored in the user registration information. In addition, the fingerprint-number mapping information may be generated by the user registering a number corresponding to a fingerprint in the user registration process. For example, the user may input a number corresponding to a fingerprint the user desires to register, or register a fingerprint corresponding to a number, and information associated with a relationship between the registered fingerprint and the number may be stored as the fingerprint-number mapping information. According to at least one example embodiment, a user may perform the registration process using the authentication apparatus or a different device. According to at least one example embodiment, the fingerprint-number mapping information may be stored in a storage device of the authentication apparatus or stored in a different storage device the data of which is accessible by the authentication apparatus.

The user authenticator 130 may determine the input number corresponding to the input fingerprint using the fingerprint-number mapping information. The user authenticator 130 may perform the user authentication based on whether the input data input through the touch input from the user is identical to the input number corresponding to the input fingerprint. For example, when the user inputs a digit of a password number, for example, "3," through a touch input to the screen, the fingerprint sensor 120 may obtain an input fingerprint from the touch input made when the user touches 3 on the screen and the user authenticator 130 may determine whether a digit corresponding to the input fingerprint is 3 based on the fingerprint-number mapping information.

The user authenticator 130 performs the user authentication based on whether the input data is identical to preregistered reference data and whether the input fingerprint detected from the touch input matches a preregistered fingerprint. Here, the reference data includes a password number, for example, "3132," or a pattern to be input from the user for successful authentication. For example, the user authenticator 130 may calculate a degree of similarity between fingerprint patterns of the input fingerprint and the registered fingerprint using a feature point-based similarity measuring method, and determine that the input fingerprint matches the registered fingerprint in response to the calculated degree of similarity being greater than or equal to a threshold value.

According to at least one example embodiment, the number of input fingerprints to match the registered fingerprint among input fingerprints included in the input fingerprint sequence may be determined based on a preset security level. For example, as the security level increase, a greater number of input fingerprints included in the input fingerprint sequence may need to match the registered fingerprint for a corresponding authentication standard, and the user authenticator 130 may perform the user authentication based on the authentication standard.

When the input data is identical to the reference data and the input fingerprint matches the registered fingerprint, the user authenticator 130 may determine the user authentication to be successful. When the user authentication is determined to be successful, the authentication apparatus 100 may, for example, cancel a lock state of a terminal device connected to the authentication apparatus 100 or grant the user a right to access a function, for example, a function of approving payment or transfer.

Conversely, when the input data differs from the reference data or the input fingerprint does not match the registered fingerprint, the user authenticator 130 may determine the user authentication to be unsuccessful. When the user authentication is determined to be unsuccessful, the authentication apparatus 100 may, for example, maintain the lock state of the terminal device or limit the right to access such a function.

According to another example embodiment, the user may sequentially input fingerprints to the authentication apparatus 100 without inputting the input data such as a password number to attempt the user authentication. The fingerprint sensor 120 may obtain an input fingerprint of the user from a touch input made within a preset area of the display 110 or a touch input applied to a component such as a button, for example, a home button of a smartphone. The user authenticator 130 may determine an input number corresponding to the input fingerprint using the fingerprint-number mapping information. The user authenticator 130 may determine whether a registered fingerprint matching the input fingerprint is present among registered fingerprints and determine, to be the input number corresponding to the input fingerprint, a number corresponding to the registered fingerprint matching the input fingerprint. When the registered fingerprint matching the input fingerprint is absent, the user authenticator 130 may output, through the display 110, a message to guide the user to re-input a fingerprint.

The user authenticator 130 may determine an input number sequence corresponding to an input fingerprint sequence of the input fingerprints sequentially input from the user, and perform the user authentication based on whether the input number sequence is identical to a preregistered reference number sequence. Here, the reference number sequence indicates a password number, for example, "3132," to be input from the user for successful authentication. When the input number sequence is identical to the reference number sequence, the user authenticator 130 may determine the user authentication to be successful. Conversely, when the input number sequence differs from the reference number sequence, the user authenticator 130 may determine the user authentication to be unsuccessful.

As described in the foregoing, by verifying a fingerprint of a user along with a PIN of the user, a higher level of security may be obtained and a user authentication method robust against fake fingerprints may be provided.

FIGS. 2A through 8 illustrate examples of performing user authentication by a fingerprint recognition based authentication apparatus based on fingerprint recognition according to at least one example embodiment. In FIGS. 3, 5, 6A, 6B, and 7, it is assumed that, in a user registration process, a user registers fingerprint information of five fingers and also fingerprint-number mapping information in which a fingerprint of a thumb corresponds to a number "1," an index finger to a number "2," a middle finger to a number "3," a ring finger to a number "4," and a little finger to a number "5." However, a scope of the examples used herein may not be limited to such an assumption. For example, in the user registration process, the user may register fingerprint information of ten fingers of both hands and also fingerprint-number mapping information in which the fingers correspond to numbers "0" through "9," respectively. Further, according to at least some example embodiments, fingers may also be mapped characters or symbols other than numbers including, for example, alphabetic letters, punctuation and special characters (e.g., $,#,&,%,*, etc.). In FIGS. 2A, 2B, 3, 5, 6A, and 7, it is assumed that a password number preregistered in the authentication apparatus is "3132."

Figure 2A:
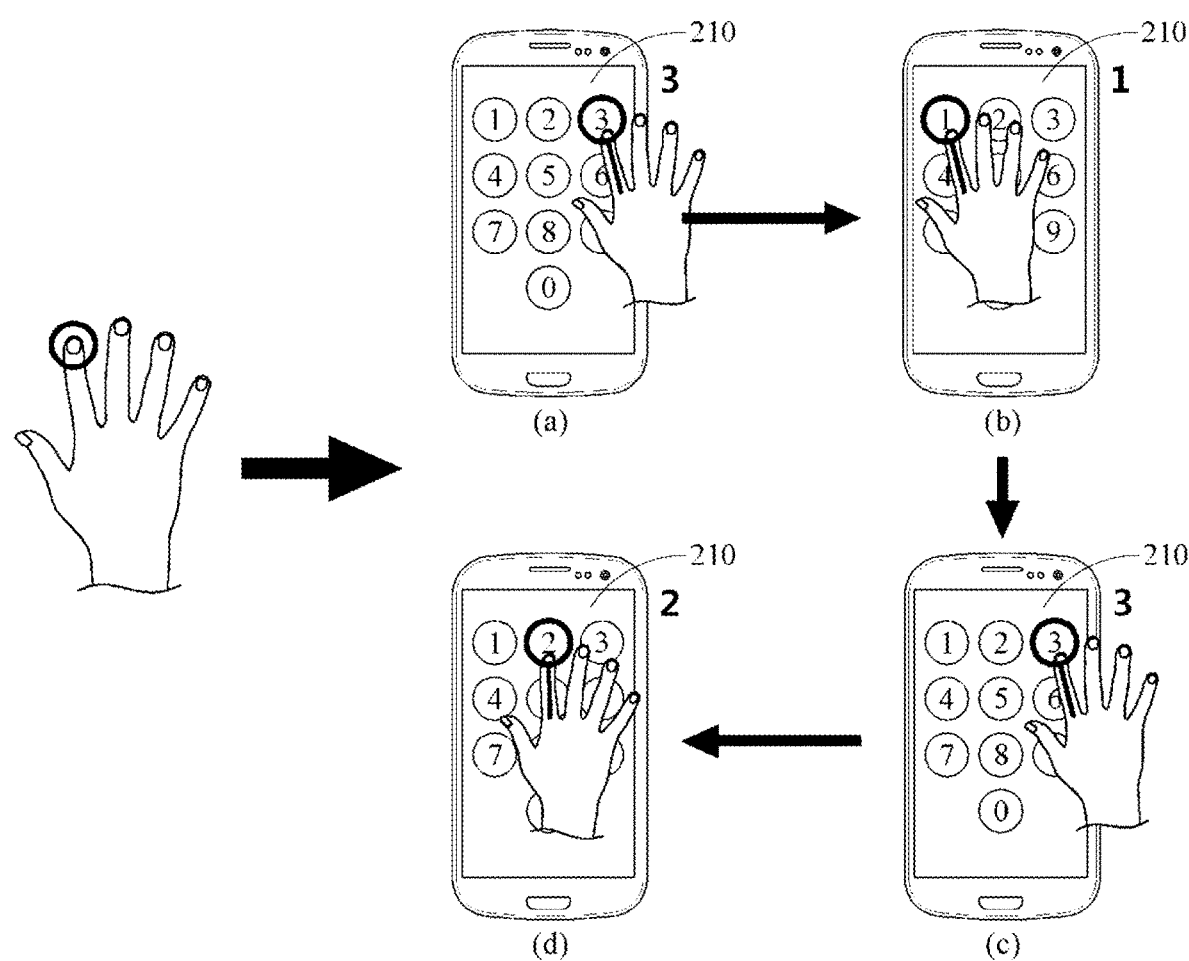
FIGS. 2A through 8 illustrate examples of performing user authentication by a fingerprint recognition based authentication apparatus based on fingerprint recognition according to at least one example embodiment.

FIG. 2A illustrates an example of performing user authentication in a case that a user inputs a password number irrespective of a finger type according to at least one embodiment. The authentication apparatus outputs, to a screen 210, a keypad to receive the password number from the user. The user may sequentially input individual digits of the password number using a finger of which a fingerprint is preregistered for the user authentication. Here, the registered finger may be at least one finger, and the registered fingerprint may be at least one fingerprint for a single finger. In FIG. 2A, it is assumed that the user inputs each digit of the password number using an index finger. The user may touch, in order as indicated by arrows, "3," "1," "3," "2" on the keypad using the index finger to input the password number, for example, "3132."

The authentication apparatus may perform the user authentication at each time the user inputs each digit of the password number using the index finger or by detecting an input fingerprint from at least one touch input and comparing the detected input fingerprint to the registered fingerprint. Alternatively, the authentication apparatus may store input fingerprints detected at each time the user inputs each digit of the password number, and perform the user authentication by comparing the stored input fingerprints to registered fingerprints after the password number is input.

When the password number input from the user by sequentially touching the digits on the keypad is identical to the reregistered password number 3132, and an input fingerprint obtained when the user touches each digit on the keypad to input the password number matches a registered fingerprint, the authentication apparatus may determine the user authentication to be successful. However, when the password number input from the user differs from the reregistered password number 3132, or the input fingerprint does not match the registered fingerprint, the authentication apparatus may determine the user authentication to be unsuccessful.

Figure 2B:
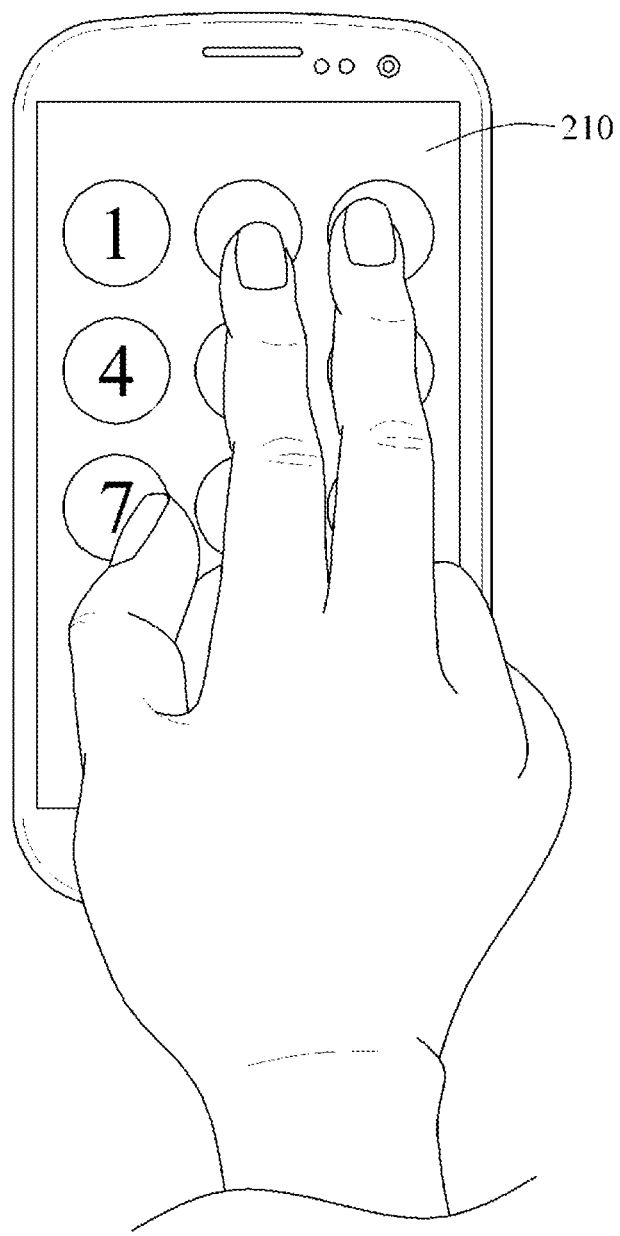

Alternatively, the user may input a password number through multi-touch. For example, as illustrated in FIG. 2B, the user may simultaneously touch a number "3" and a number "2" on the keypad to input the numbers "3" and "2." Here, for successful authentication, respective fingerprints of an index finger and a middle finger touching the numbers 3 and 2, respectively, on the keypad may need to be preregistered. The authentication apparatus may obtain a plurality of input fingerprints from the multi-touch. The authentication apparatus may determine whether to authenticate the user based on whether the password number input through the multi-touch is identical to a registered password number and on whether input fingerprints of the user inputting the numbers on the keypad match registered fingerprints.

FIG. 2C illustrates another example of a screen to receive an input for user authentication according to at least one example embodiment.

The screen to receive an input for user authentication may be provided as a screen 230 in a form of a piano keyboard as illustrated in FIG. 2C. The screen 230 in the form of a piano keyboard is provided as an example, and the authentication apparatus may output various forms of user interface (UI) screens to sequentially receive touch inputs from a user.

In a registration process for the user authentication, the user may touch piano keys on the screen 230 using at least one finger of which a corresponding fingerprint is to be registered, and register a sequence of musical scales along with the fingerprint. In FIG. 2C, it is assumed that the user registers a sequence of musical scales, for example, do→sol-→mi→si, along with a fingerprint of an index finger by sequentially touching the corresponding piano keys using the index finger.

In an authentication process, the user may sequentially touch the musical scales, for example, do, sol, mi, and si, on the piano keyboard on the screen 230 using the index finger for the user authentication. At each time the user touches a piano key with the index finger, the authentication apparatus may detect an input fingerprint, determine whether the detected input fingerprint matches a registered fingerprint, and determine whether the sequence of the musical scales input through the touch inputs from the user is identical to a preregistered sequence of musical scales. When the input fingerprint matches the registered fingerprint and the input sequence of the musical scales is identical to the registered sequence of the musical scales, the authentication apparatus may determine the user authentication to be successful. However, when the input fingerprint does not match the registered fingerprint or the input sequence of the musical scales differs from the registered sequence of the musical scales, the authentication apparatus may determine the user authentication to be unsuccessful.

Figure 3:
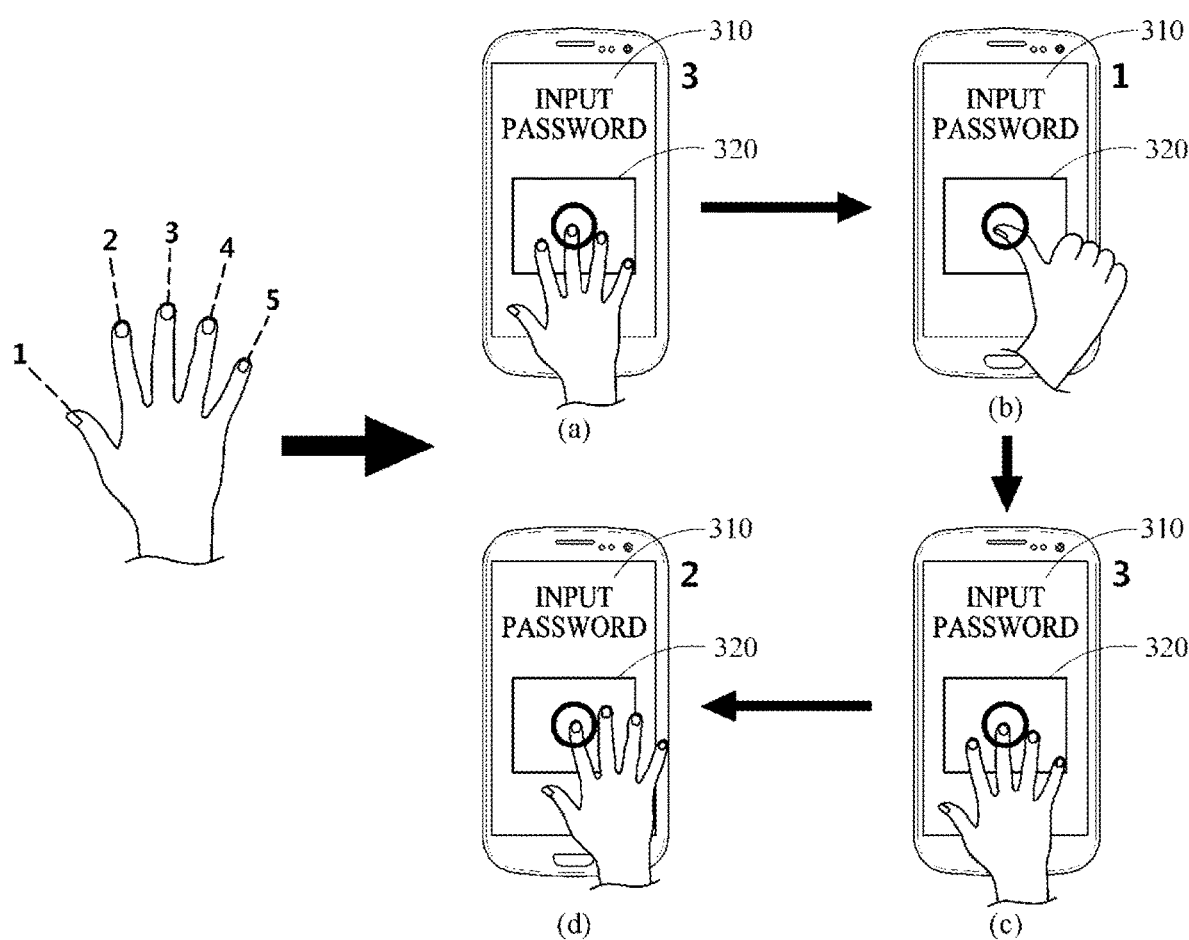

FIG. 3 illustrates an example of performing user authentication in a case that a user sequentially inputs fingerprints to an area on a display according to at least one embodiment. Referring to FIG. 3, the authentication apparatus may output a screen 310 including an area 320 to receive a fingerprint of a user. The user may touch the area 320 on the screen 310 using fingerprints in order of digits of a preregistered password number, for example, 3132. To input the password number, the user may touch the area 320 using a middle finger in (a), touch the area 320 using a thumb in (b), touch the area 320 using the middle finger in (c), and touch the area 320 using an index finger in (d). In (a) through (d), the authentication apparatus may obtain input fingerprints from touch inputs through a fingerprint sensor, and determine input numbers corresponding to the obtained input fingerprints using fingerprint-number mapping information.

When a password number determined through the input fingerprints is identical to the password number 3132, the authentication apparatus may determine the authentication to be successful. However, when the determined password number differs from the password number 3132, or the input fingerprints obtained from the touch inputs are not a registered fingerprint, the authentication apparatus may determine the authentication to be unsuccessful.

Figure 4A:
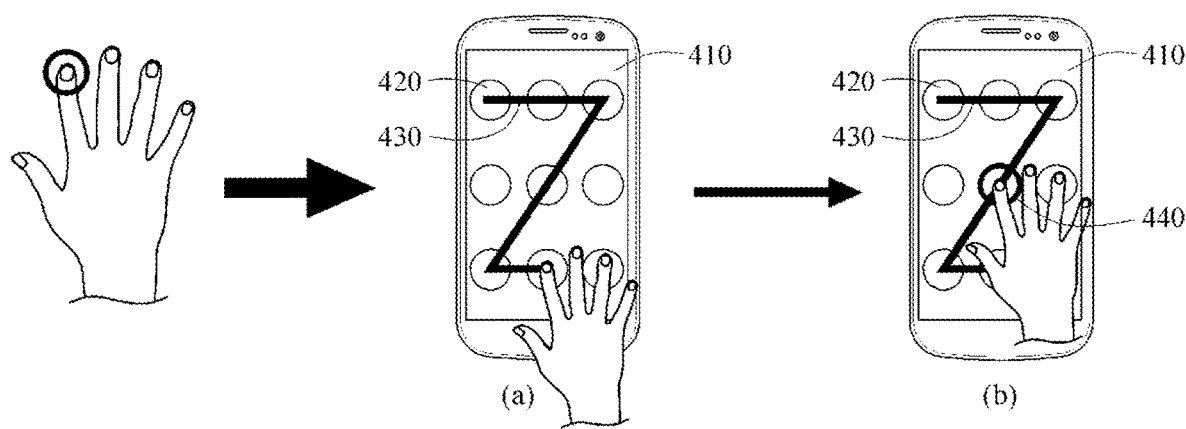
Figure 4B:
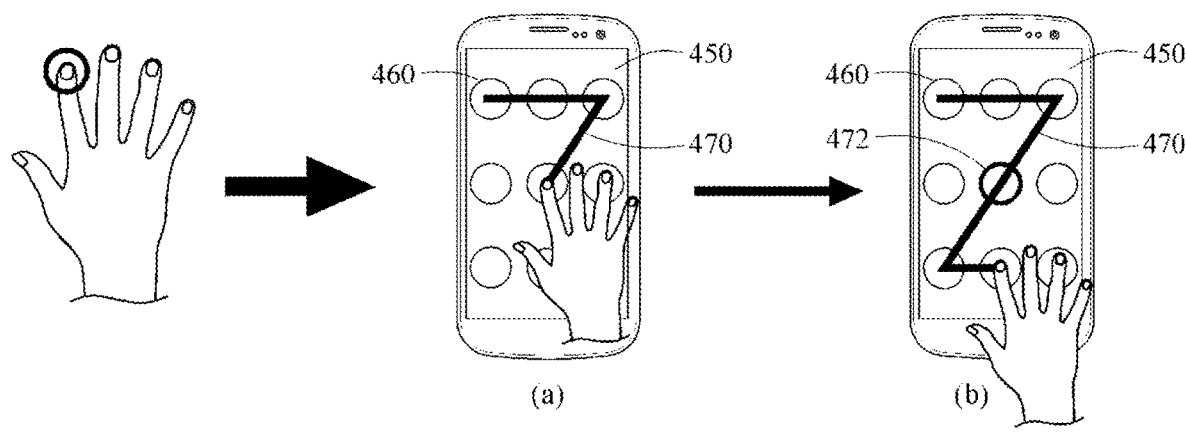

FIGS. 4A and 4B illustrate an example of performing user authentication in a case that a user inputs a pattern to a screen using a finger according to at least one embodiment.

Referring to FIG. 4A, in a registration process for user authentication, a screen 410 may be output to allow a user to register a pattern A plurality of pattern input points 420 may be output to the screen 410 to guide the user in inputting the pattern. In (a), the user may register a pattern 430 based on the pattern input points 420. In (b), the user may select, from candidate areas based on the pattern input points 420, an area 440 on which fingerprint recognition is to be performed in an authentication process. Here, a location and a number of areas on which fingerprint recognition is to be performed may not be restricted. For example, the user may select another area or a plurality of areas, aside from the area 440, on which fingerprint recognition is to be performed. In at least one of (a) and (b) operations, a fingerprint may be registered. As described in the foregoing, in the registration process, the pattern 430 for the user authentication, the fingerprint to be registered, and the area 440 on which fingerprint recognition is to be performed may be registered.

Referring to FIG. 4B, in the authentication process, a screen 450 may be output to receive an input for user authentication. A plurality of pattern input points 460 may be output to the screen 450 to guide a user to input a pattern. In (a), the user may input a pattern 470 based on the pattern input points 460. In (b), when a finger of the user passes an area 472 selected in the registration process while inputting the pattern 470, the authentication apparatus may perform fingerprint recognition on the area 472 to obtain a fingerprint of the user, and determine whether the obtained fingerprint matches a registered fingerprint.

When the input pattern 470 is identical to a registered pattern and the fingerprint obtained in the area 472 matches the registered fingerprint, the authentication apparatus may determine the authentication to be successful. However, when the input pattern 470 differs from the registered pattern or the obtained fingerprint does not match the registered fingerprint, the authentication apparatus may determine the authentication to be unsuccessful.

Figure 4C:
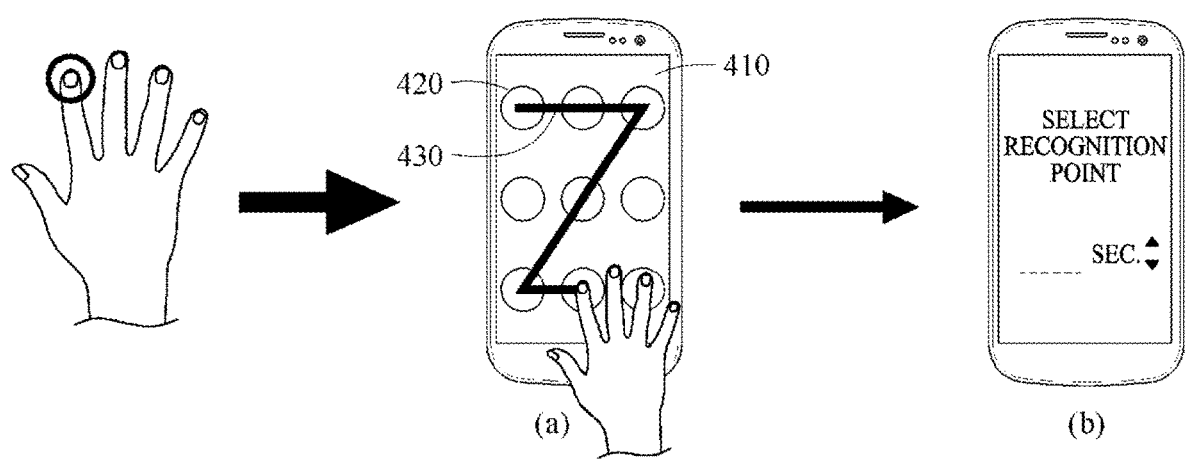
Figure 4D:
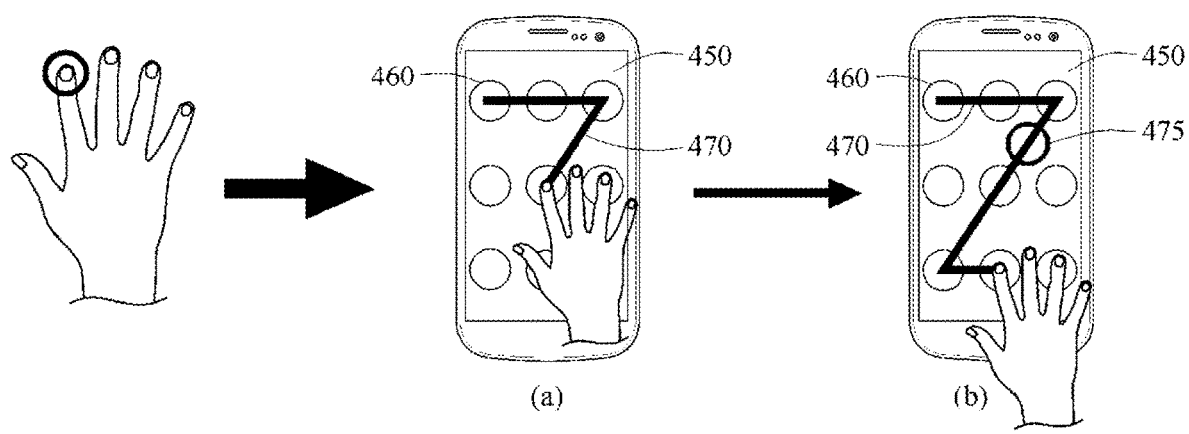

FIGS. 4C and 4D illustrate another example of performing user authentication in a case that a user inputs a pattern to a screen using a finger according to at least one embodiment.

Referring to FIG. 4C, similar to the example illustrated in FIG. 4A, a screen 410 may be output to allow a user to register a pattern in a registration process for user authentication. In (a), the user may register a fingerprint of a finger to be registered along with a pattern 430 to be registered based on pattern input points 420. In (b), the user may select a point in time at which fingerprint recognition is to be performed in an authentication process. Here, it is assumed that the user selects 0.3 second as the point for the fingerprint recognition. However, the point for the fingerprint recognition selectable by the user may not be restricted. As described in the foregoing, in the registration process, the pattern 430 for the user authentication, the fingerprint of the finger to be registered, and the point at which the fingerprint recognition is to be performed may be registered.

Referring to FIG. 4D, similar to the example illustrated in FIG. 4B, a screen 450 may be output to receive an input from a user for user authentication in an authentication process. In (a), the user may input a pattern 470 based on pattern input points 460. In (b), when the user reaches a recognition point selected in the registration process, for example, at a point in time when 0.3 seconds elapse after inputting the pattern 470, while inputting the pattern 470, the authentication apparatus may obtain a fingerprint of the user by performing fingerprint recognition at the recognition point and determine whether the obtained fingerprint matches a registered fingerprint. Here, it is assumed that a touch input from the user is placed in an area 475 at the recognition point registered in the registration process. In such a case, the fingerprint recognition may be performed on the area 475.

When the input pattern 470 is identical to a registered pattern and the fingerprint obtained in the area 475 matches a registered fingerprint, the authentication apparatus may determine the authentication to be successful. When the input pattern 470 differs from the registered pattern or the obtained fingerprint does not match the registered fingerprint, the authentication apparatus may determine the authentication to be unsuccessful.

Figure 4E:
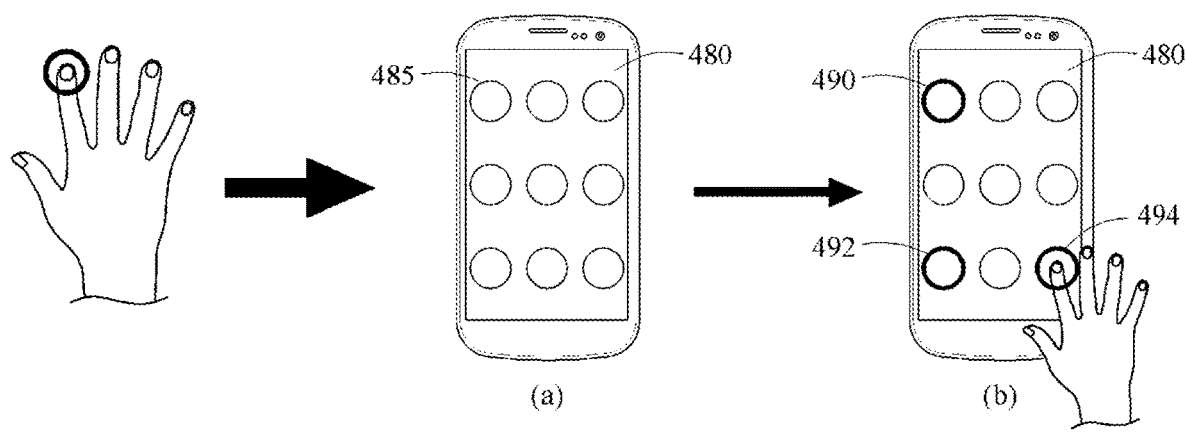
Figure 4F:
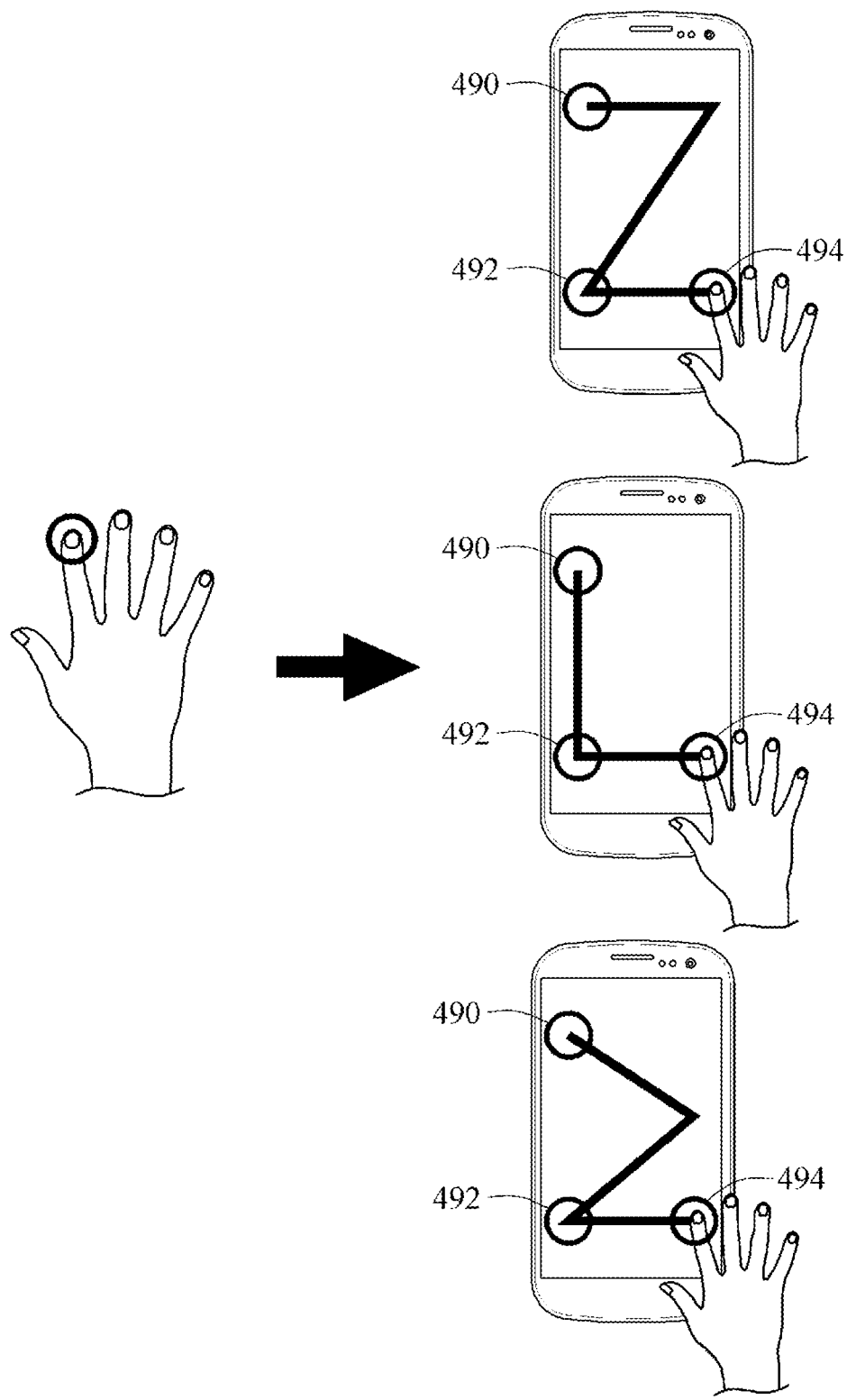

FIGS. 4E and 4F illustrate still other examples of performing user authentication in a case that a user inputs a pattern on a screen using a finger according to at least one embodiment.

Referring to FIG. 4E, in (a) for user registration, a screen 480 may be output to allow a user to select a fingerprint recognition area. A plurality of candidate areas 485 may be output to the screen 480. In (b), the user may select, from the candidate areas 485, fingerprint recognition areas, for example, an area 490, an area 492, and an area 494, on which fingerprint recognition is to be performed. Here, the number of fingerprint recognition areas to be selected by the user may not be restricted, and the user may register the fingerprint recognition areas along with a fingerprint of a finger to be registered. Here, it is assumed that the user registers a fingerprint of an index finger. Alternatively, the candidate areas 485 may not be output to the screen 480, and the fingerprint recognition areas may be determined by the user selecting random areas on the screen 480.

Referring to FIG. 4F, in an authentication process, the user may input a pattern passing through the fingerprint recognition areas 490, 492, and 494 selected in the registration process for user authentication. For example, the use may input various patterns passing through the fingerprint recognition areas 490, 492, and 494 through connected touch inputs as illustrated in upper, middle, and lower portions of FIG. 4F. When a touch input from the user passes through the fingerprint recognition areas 490, 492, and 494, the authentication apparatus may perform fingerprint recognition on the fingerprint recognition areas 490, 492, and 494 to obtain a fingerprint of the user, and determine whether the obtained fingerprint matches a registered fingerprint.

When the pattern input from the user passes through all the fingerprint recognition areas 490, 492, and 494, and the fingerprint obtained in the fingerprint recognition areas 490, 492, and 494 matches the registered fingerprint, the authentication apparatus may determine the authentication to be successful. When the pattern input from the user does not pass any one of the fingerprint recognition areas 490, 492, and 494, or the fingerprint obtained in the fingerprint recognition areas 490, 492, and 494 does not match the registered fingerprint, the authentication apparatus may determine the authentication to be unsuccessful.

Alternatively, to determine whether the authentication is successful or unsuccessful, an order in which the input pattern passes the fingerprint recognition areas 490, 492, and 494 may be further considered. For example, in a case that the fingerprint recognition areas 490, 492, and 494 are registered in the registration process in order of the area 490, the area 492, and the area 494, the authentication apparatus may determine the authentication to be unsuccessful when the input pattern does not pass through the fingerprint recognition areas 490, 492, and 494 in order of the area 490, the area 492, and the area 494 in the authentication process.

Figure 5:
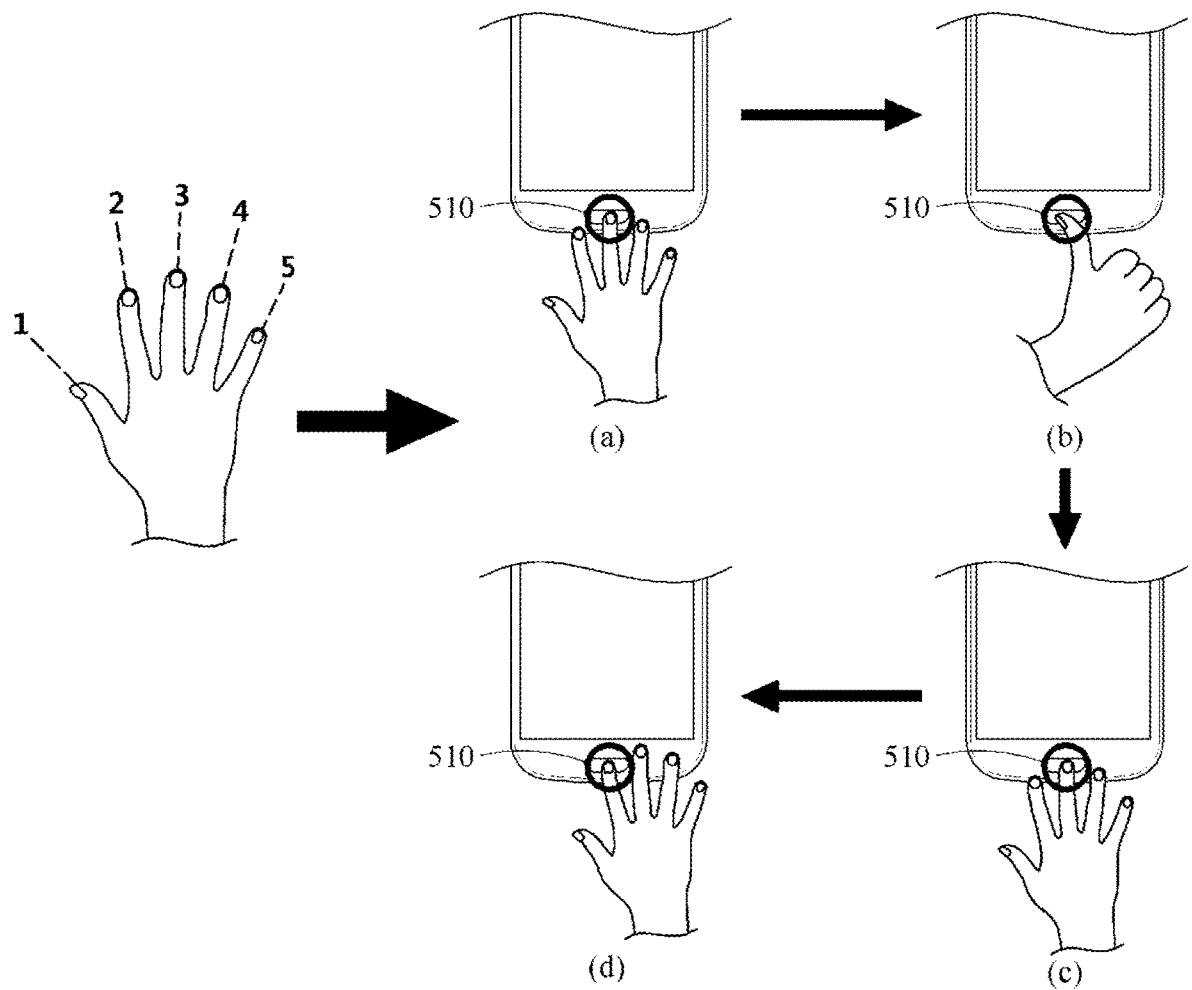

FIG. 5 illustrates an example of performing user authentication in a case that a user sequentially inputs fingerprints to a component such as a button according to at least one embodiment. Referring to FIG. 5, a fingerprint sensor configured to obtain an input fingerprint may be embedded in a button 510 of a mobile device. The user may touch the button 510 with fingerprints of fingers in order of digits of a registered password number, for example, 3132. To sequentially input the digits of the password number, the user may touch the button 510 with a middle finger in (a), touch the button 510 with a thumb in (b), touch the button 510 with the middle finger in (c), and touch the button 510 with an index finger in (d). In each of (a), (b), (c), and (d) operations, the authentication apparatus may obtain an input fingerprint from a touch input through a fingerprint sensor, and determine an input number corresponding to the input fingerprint obtained in each operation using fingerprint-number mapping information. The authentication apparatus may perform user authentication based on whether a password number corresponding to an input fingerprint sequence is identical to the registered password number 3132.

The authentication apparatus may perform fingerprint recognition at each time the user inputs a fingerprint to the button 510 to determine whether the input fingerprint is a registered fingerprint and determine an input number corresponding to the input fingerprint. A case in which the user inputs a correct password number by inputting a fingerprint is described as follows.

In (a), when the user inputs a fingerprint of the middle finger corresponding to a digit "3" through the button 510 in which the fingerprint sensor is embedded, the authentication apparatus may determine that the detected input fingerprint matches a prestored registered fingerprint and determine the digit 3 mapped to a corresponding registered fingerprint to be a digit of a password number input from the user. In (b), when the user inputs a fingerprint of the thumb corresponding to a digit "1" through the button 510, the authentication apparatus may determine that the detected input fingerprint matches a registered fingerprint and determine the digit 1 mapped to the corresponding registered fingerprint to be a digit of the password number input from the user. By continuously performing such operations described in the foregoing, the user may input the password number by inputting a fingerprint, and the authentication apparatus may determine whether the authentication is successful by comparing the input password number to the registered password number. Similar to FIG. 3, the authentication apparatus may perform user authentication based on whether an input password number is identical to a registered password number and whether an input fingerprint matches a registered fingerprint.

Figure 6A:
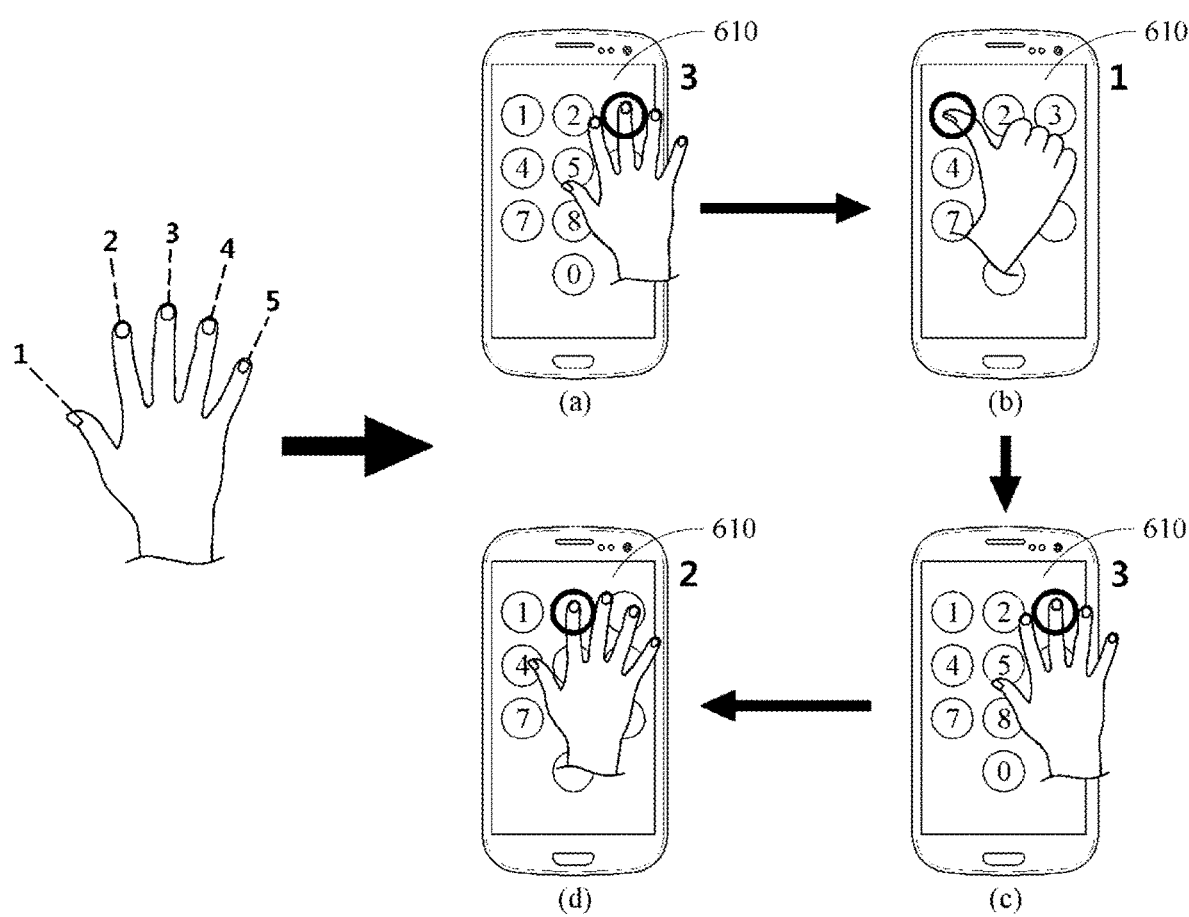

FIG. 6A illustrates an example of performing user authentication in a case that a user touches a password number with a finger corresponding to each digit of the password number according to at least one embodiment. The authentication apparatus may output, as a screen 610 to receive an input for user authentication, a keypad to receive a password number. The user may touch each digit on the keypad with a finger corresponding to each digit of a password number the user desires to input, for example, 3132. To sequentially input the password number, the user may touch a digit "3" on the keypad with a middle finger in (a), touch a digit "1" on the keypad with a thumb in (b), touch the digit "3" with the middle finger in (c), and touch a digit "2" with an index finger in (d). In each of (a), (b), (c), and (d) operations, the authentication apparatus may perform fingerprint recognition to obtain an input fingerprint from a touch input from the user, and determine an input number corresponding to the obtained input fingerprint using preregistered fingerprint-number mapping information.

The authentication apparatus may authenticate the user based on the fingerprint recognition and on whether input data input from the user sequentially touching the digits on the keypad is identical to the password number 3132 which is preregistered reference data. When the user touches the digits on the keypad to input the password number, the authentication apparatus may authenticate the user based on whether each digit touched is identical to a digit corresponding to the input fingerprint. When each digit touched on the keypad is identical to the digit corresponding to the input fingerprint obtained when the user touches the corresponding digit on the keypad, and the password number input from the user touching the keypad is identical to the registered password number, the authentication apparatus may determine the authentication to be successful. When the digit touched on the keypad differs from the digit corresponding to the input fingerprint obtained when the corresponding digit on the keypad is touched or the input fingerprint is not the registered fingerprint, the authentication apparatus may determine the authentication to be unsuccessful. In addition, when the password number input from the user touching the keypad differs from the registered password number 3132, the authentication apparatus may determine the authentication to be unsuccessful.

Figure 6B:
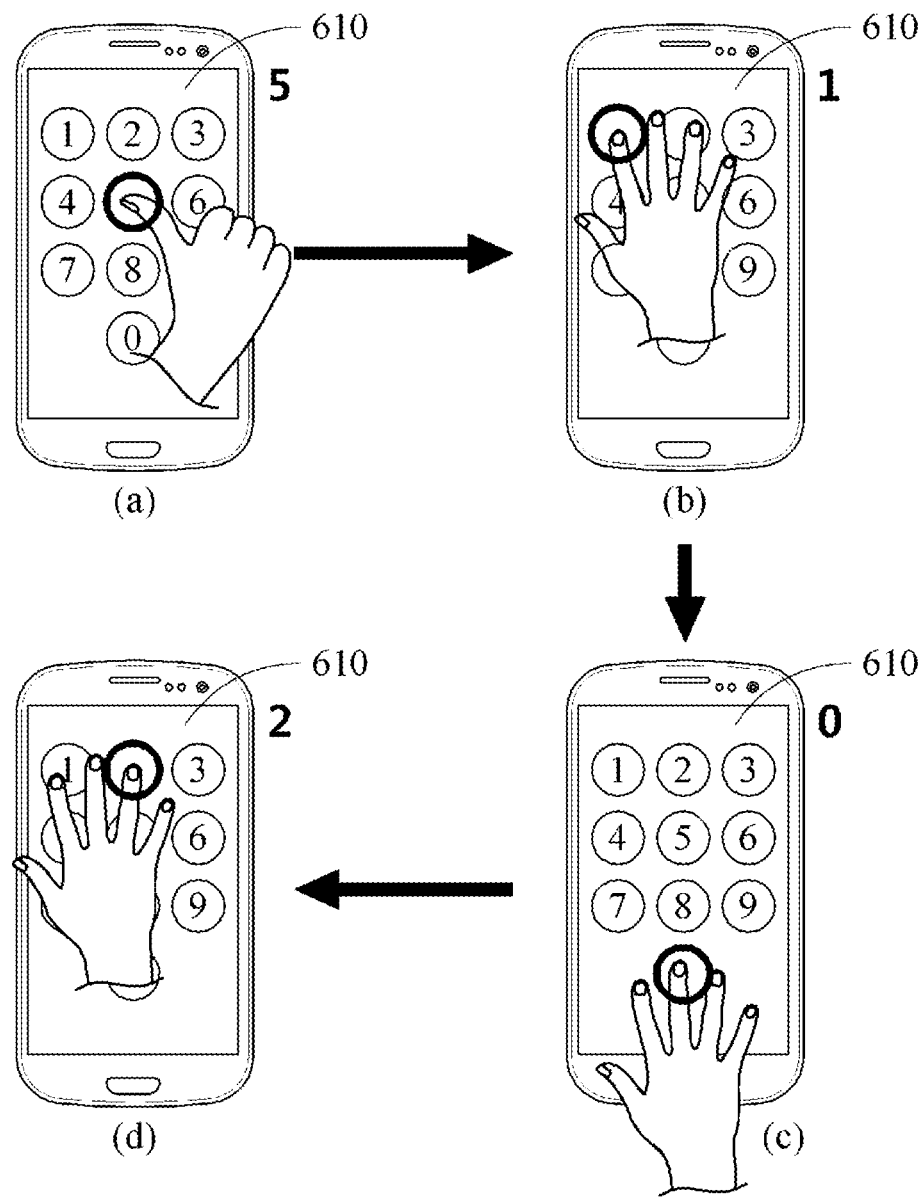

FIG. 6B illustrates an example of performing user authentication based on an input order of fingerprints in addition to a password number according to at least one embodiment. In a registration process for user authentication, a user may register a password number and also register an input order of fingerprints to be touched when inputting the password number. For example, when the user registers a password number, for example, "5102," using a thumb for a digit "5," an index finger for a digit "1," a middle finger for a digit "0," and a ring finger for a digit "2," an input order of a fingerprint of the thumb, a fingerprint of the index finger, a fingerprint of the middle finger, and a fingerprint of the ring finger may be registered along with the password number 5102.

In an authentication process, the authentication apparatus may output a screen 610 including a keypad to receive an input for user authentication. To sequentially input the individual digits of the registered password number 5102 on the screen 610, the user may touch the digit 5 on the keypad with the thumb in (a), touch the digit 1 with the index finger in (b), touch the digit 0 with the middle finger in (c), and touch the digit 2 with the ring finger in (d). In each of (a), (b), (c), and (d) operations, the authentication apparatus may obtain an input fingerprint from a touch input from the user by performing fingerprint recognition, and authenticate the user based on whether an input order of the input fingerprints obtained from a touch input sequence is identical to a preregistered input order of fingerprints.

When a password number input from the user touching the keypad is identical to the registered password number, and an input order of input fingerprints is identical to the registered input order of fingerprints, the authentication apparatus may determine the authentication to be successful. When the password number input from the user differs from the registered password number, the input fingerprint does not match the registered fingerprint, or the input order of the input fingerprints differs from the registered input order of fingerprints, the authentication apparatus may determine the authentication to be unsuccessful.

Figure 7:
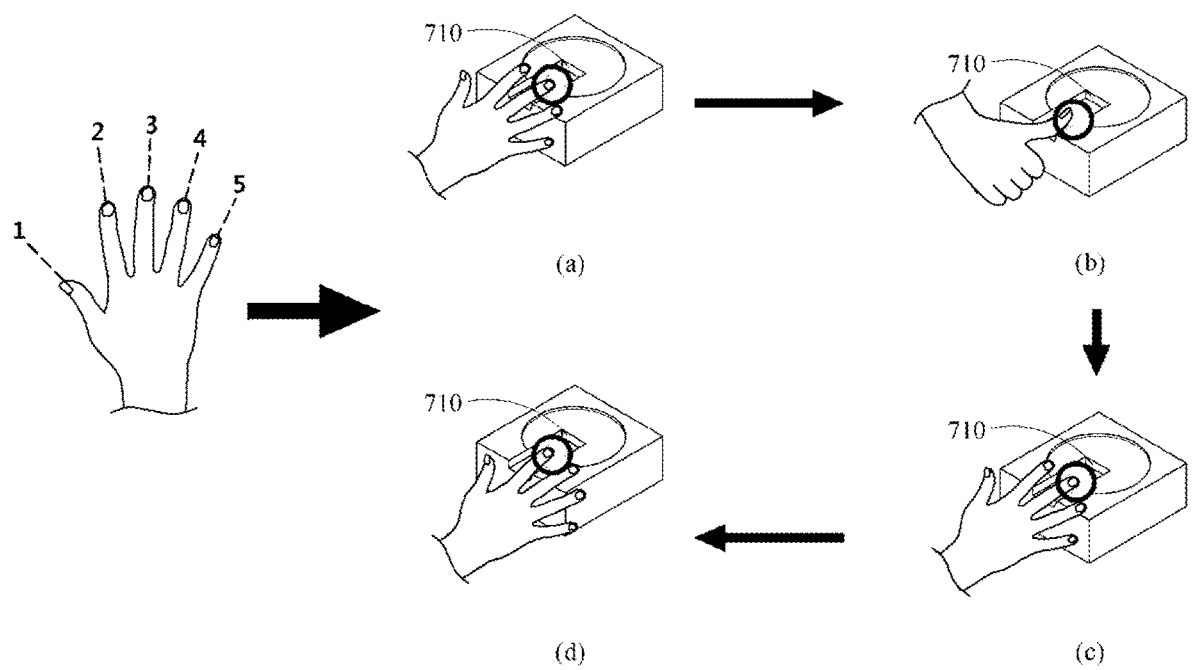

FIG. 7 illustrates an example of an authentication apparatus applied to a fingerprint recognition based apparatus according to at least one embodiment. For example, the authentication apparatus may be applied to a fingerprint recognition based apparatus such as, for example, an automated teller machine (ATM), which is configured to authenticate a user through fingerprint recognition. Similar to the examples illustrated in FIGS. 3 and 5, the user may sequentially input fingerprints to a fingerprint sensor 710 of the fingerprint recognition based apparatus through (a), (b), (c), and (d) operations. Here, the user may touch the fingerprint sensor 710 with a finger corresponding to each digit of a password number based on digits mapped to multiple fingers. The authentication apparatus may detect an input fingerprint from a touch input to the fingerprint sensor 710, and determine a password number corresponding to an input fingerprint sequence of the input fingerprints using fingerprint-number mapping information. When the determined password number is identical to a preregistered password number, for example, "3132," the authentication apparatus may determine the authentication to be successful. When the determined password number differs from the registered password number 3132 or the input fingerprint obtained from the touch input is not a registered fingerprint, the authentication apparatus may determine the authentication to be unsuccessful.

Figure 8:
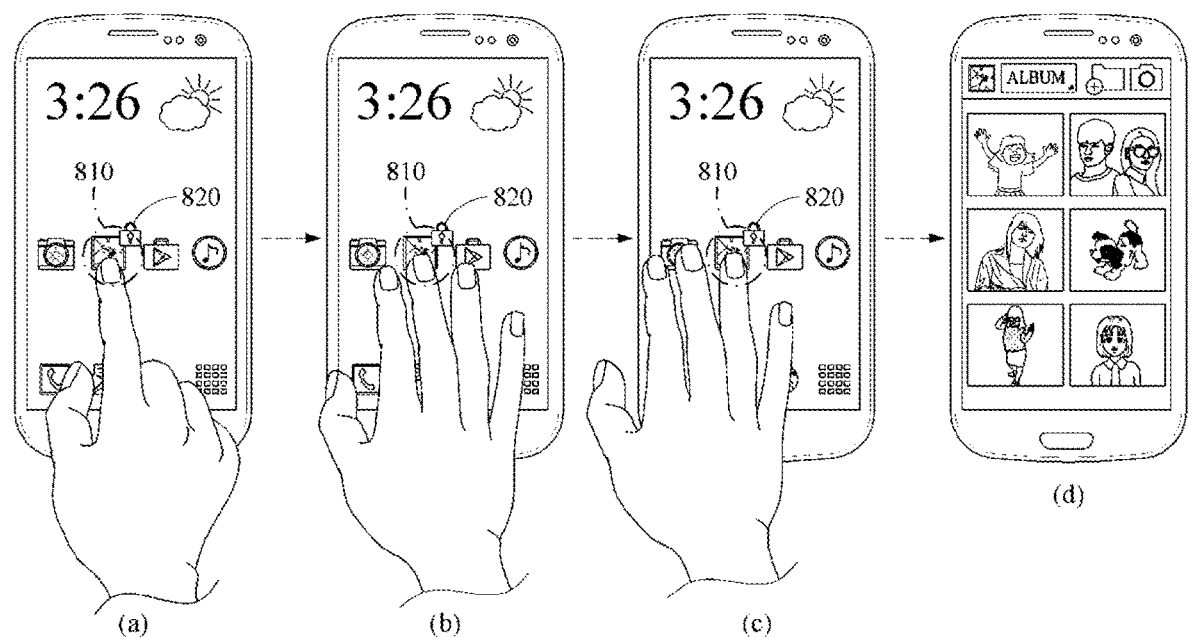

FIG. 8 illustrates an example of performing user authentication by recognizing a sequence of fingerprints of a user touching an icon area according to at least one embodiment. In FIG. 8, it is assumed that a fingerprint sequence of a fingerprint of an index finger, a fingerprint of a middle finger, and a fingerprint of a ring finger is preregistered in a registration process for user authentication. The user may set a right for access to an application 810 in a smartphone and such. For example, when a limited access is set for the application 810, access to the application 810 may be granted when fingerprint recognition based authentication is successfully performed. However, when the authentication is unsuccessfully performed, access to the application 810 may be restricted or a partial function of the application 810 may be restricted.

The application 810 may be provided in a form of an icon on a screen. When the limited access is set for the application 810, an identifier 820 may be provided along with the icon to inform a user of the limited access. When the limited access is set for the application 810, the user may sequentially touch icon areas of the application 810 with an index finger, a middle finger, and a ring finger in (a), (b), and (c) operations, respectively, to access the application 810.

The authentication apparatus may obtain a fingerprint of the user from a touch input at each time the user touches each icon area of the application 810 with a finger, and determine whether the obtained fingerprint matches a registered fingerprint. When the obtained fingerprint matches the registered fingerprint and an input fingerprint sequence is identical to a registered fingerprint sequence, the authentication apparatus may allow the user to access the application 810. For example, in a case that a limited access is set for a photo album application, when a fingerprint obtained when the user touches a photo album matches a registered fingerprint and a sequence of fingerprints input when the user touches the photo album is identical to a registered fingerprint sequence, the limited access set for the photo album may be released and the user may be allowed to access the photo album as illustrated in (d) of FIG. 8. When the obtained fingerprint does not match the registered fingerprint or the input fingerprint sequence differs from the registered fingerprint sequence, the authentication apparatus may restrict access to the application 810 or execution of a partial function.

Figure 9:
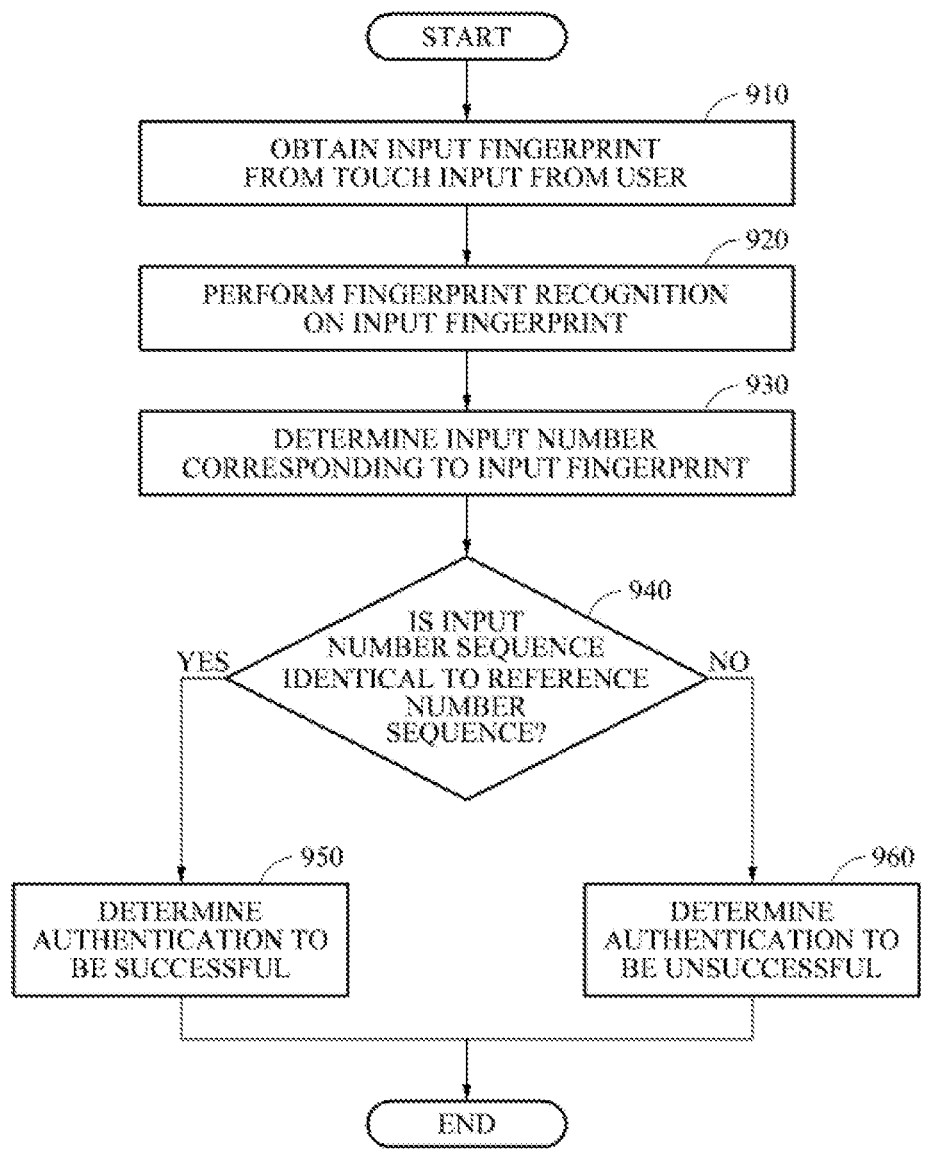
FIG. 9 is a flowchart illustrating an example of a fingerprint recognition based authentication method according to at least one example embodiment.

FIG. 9 is a flowchart illustrating an example of a fingerprint recognition based authentication method according to at least one example embodiment. The authentication method may be performed by an authentication apparatus including at least one processor.

Referring to FIG. 9, in operation 910, the authentication apparatus obtains an input fingerprint from a touch input from a user. For example, the authentication apparatus may obtain an input fingerprint from a touch input made on a preset area of a display or obtain an input fingerprint through a fingerprint sensor embedded in a button.

In operation 920, the authentication apparatus performs fingerprint recognition on the input fingerprint. The authentication apparatus may determine whether a registered fingerprint matching the input fingerprint is present among registered fingerprints. For example, the authentication apparatus may calculate a degree of similarity between a feature extracted from the input fingerprint and a feature extracted from the registered fingerprint, and determine that the input fingerprint matches the registered fingerprint in response to the calculated degree of similarity being greater than or equal to a threshold value. However, when the registered fingerprint matching the input fingerprint is absent, the authentication apparatus may output a message to request the user to re-input a fingerprint.

In operation 930, the authentication apparatus determines an input number corresponding to the input fingerprint using preregistered fingerprint-number mapping information. When the registered fingerprint matching the input fingerprint is present, the authentication apparatus may identify a number corresponding to the registered fingerprint matching the input fingerprint based on the fingerprint-number mapping information, and determine the identified number to be the input number corresponding to the input fingerprint.

In operation 940, the authentication apparatus determines whether an input number sequence corresponding to an input fingerprint sequence is identical to a reference number sequence. The authentication apparatus may determine the input number sequence corresponding to the input fingerprint sequence by repeatedly performing operations 910 through 930 on each fingerprint sequentially input. When the determined input number sequence is identical to the reference number sequence, the authentication apparatus determines user authentication to be successful in operation 950. When the determined input number sequence differs from the reference number sequence, the authentication apparatus determines the user authentication to be unsuccessful in operation 960.

FIG. 10 is a flowchart illustrating another example of a fingerprint recognition based authentication method according to at least one example embodiment. The authentication method may be performed by an authentication apparatus including at least one processor.

Referring to FIG. 10, in operation 1010, the authentication apparatus outputs a screen to obtain an input for user authentication. For example, the authentication apparatus may output, through a display, the screen to receive a password number or a pattern to be input from a touch input from a user.

In operation 1020, the authentication apparatus obtains input data from a touch input sequence of touch inputs sequentially made to the screen, and obtains an input fingerprint from a touch input. In operation 1030, the authentication apparatus determines whether the input fingerprint included in the touch input sequence matches a registered fingerprint. The authentication apparatus may determine whether an input fingerprint detected from a touch input matches the registered fingerprint at each time a touch input is made.

Alternatively, the number of input fingerprints to match registered fingerprints is determined among input fingerprints included in an input fingerprint sequence based on a preset security level. For example, in response to a higher security level, an authentication standard for which a greater number of input fingerprints among the input fingerprints included in the input fingerprint sequence needs to match the registered fingerprints may be determined. The authentication apparatus may perform user authentication based on the determined authentication standard.

When the input fingerprint is determined to match the registered fingerprint, the authentication apparatus determines whether the input data is identical to reference data in operation 1040. When the input data is identical to the reference data, the authentication apparatus determines the user authentication to be successful in operation 1050. For example, when a password number input through a touch input from the user is identical to a preregistered password number or a pattern corresponding to a touch input sequence is identical to a preregistered pattern, the authentication apparatus may determine the user authentication to be successful. When the input fingerprint does not match the registered fingerprint or the input data differs from the reference data, the authentication apparatus determines the user authentication to be unsuccessful in operation 1060.

Alternatively, the authentication apparatus may differently apply a standard for a success in the user authentication based on the set security level. For example, in a case of to a low security level, the authentication apparatus may determine the user authentication to be successful in operation 1050 when input fingerprints match all registered fingerprints although the input data is not identical to the reference data. For another example, the number of input fingerprints to match the registered fingerprints or the number of components of the input data identical to the reference data, for example, the number of digits included in a password number, may vary depending on a security level.

An order of performing operations 1030 and 1040 may change, and thus operation 1040 may be performed prior to operation 1030 or operations 1030 and 1040 may be independently performed in parallel without being affected by each other.

The units, devices and/or modules described herein may be implemented using hardware components and software components. For example, the hardware components may include microphones, amplifiers, band-pass filters, audio to digital convertors, and processing devices. A processing device may be implemented using one or more hardware devices configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. According to at least some example embodiments, the program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A fingerprint recognition based authentication method, comprising:
    outputting a screen displaying a plurality of symbols;
    obtaining, via a sequence of touch inputs to the screen,
        a sequence of input symbols selected by a user from among the plurality of symbols displayed on the screen, the sequence of input symbols being symbols from among the displayed plurality of symbols that are touched by the sequence of touch inputs, and
        a sequence of input fingerprints corresponding to the sequence of touch inputs; and
    performing user authentication based on,
        a comparison between the sequence of input symbols and a reference sequence of symbols, and
        a comparison between to the sequence of input fingerprints and a reference sequence of fingerprints.

2. The method of claim 1, further comprising:
    determining whether registered fingerprints matching the input fingerprints are present among registered fingerprints stored in a storage device.

3. The method of claim 1, wherein the performing of the user authentication comprises:
    determining the user authentication to be unsuccessful in response to the sequence of input symbols differing from the reference sequence of symbols or the sequence of input fingerprints differing from the reference sequence of fingerprints.

4. A fingerprint recognition based authentication method, comprising:
    outputting a screen displaying a plurality of symbols;
    obtaining, via a touch input to the screen,
        an input symbol selected by a user from among the plurality of symbols displayed on the screen, the input symbol being a symbol from among the displayed plurality of symbols that is touched by the touch input, and
        an input fingerprint corresponding to the touch input; and
    performing user authentication based on,
        whether the input fingerprint matches a registered fingerprint of a user, and
        whether a mapped symbol matches the input symbol, the mapped symbol being a symbol that corresponds to the input fingerprint in accordance with preregistered fingerprint-symbol mapping information.

5. The method of claim 4, wherein the performing of the user authentication comprises:
    determining whether an input fingerprint detected from a touch input matches a registered fingerprint each time a touch input is made.

6. The method of claim 4, wherein the obtaining of the input fingerprint comprises:
    obtaining the input fingerprint from the touch input at a preset point in a time section in which the touch input is made.

7. The method of claim 4, wherein the obtaining of the input fingerprint comprises:
    obtaining the input fingerprint from the touch input when a number of touch inputs applied to the screen reaches a threshold value.

8. The method of claim 4, wherein the performing of the user authentication comprises:
    performing the user authentication based on whether a pattern corresponding to a sequence of touch inputs to the screen is identical to a preregistered pattern.

9. The method of claim 4, wherein the obtaining of the input symbol and the input fingerprint comprises:
    obtaining a sequence of input symbols and a sequence of input fingerprints based on a sequence of touch inputs to the screen.

10. The method of claim 4, wherein the performing of the user authentication comprises:
    determining whether a number of input fingerprints that match a registered fingerprint among input fingerprints detected from a touch input sequence to the screen, the number being based on a preset security level.

11. The method of claim 4, wherein the obtaining of the input fingerprint comprises:
    obtaining a plurality of input fingerprints from a multi-touch input.

12. The method of claim 4, wherein the performing of the user authentication comprises:
    performing the user authentication based on whether an input order of input fingerprints obtained from a touch input sequence to the screen is identical to a preregistered fingerprint input order.

13. A non-transitory computer readable medium storing a computer program which, when executed, configures a processor to perform the following:
    outputting a screen displaying a plurality of symbols;
    obtaining, via a sequence of touch inputs to the screen,
        a sequence of input symbols selected by a user from among the plurality of symbols displayed on the screen, the sequence of input symbols being symbols from among the displayed plurality of symbols that are touched by the sequence of touch inputs, and
        a sequence of input fingerprints corresponding to the sequence of touch inputs; and
    perform user authentication based on,
        a comparison between the sequence of input symbols and a reference sequence of symbols, and
        a comparison between to the sequence of input fingerprints and a reference sequence of fingerprints.

14. A fingerprint recognition based authentication apparatus, comprising:
    memory storing computer-executable instructions; and
    a hardware processor configured to execute the computer-executable instructions such that the hardware processors is configured to,
        output a screen displaying a plurality of symbols,
        obtain, via a sequence of touch inputs to the screen,
            a sequence of input symbols selected by a user from among the plurality of symbols displayed on the screen, the sequence of Input symbols being symbols from among the displayed plurality of symbols that are touched by the sequence of touch inputs, and
            a sequence of input fingerprints corresponding to the sequence of touch inputs, and
    perform user authentication based on,
        a comparison between the sequence of input symbols and a reference sequence of symbols, and
        a comparison between to the sequence of input fingerprints and a reference sequence of fingerprints.

* * * * *